Patented Oct. 29, 1929

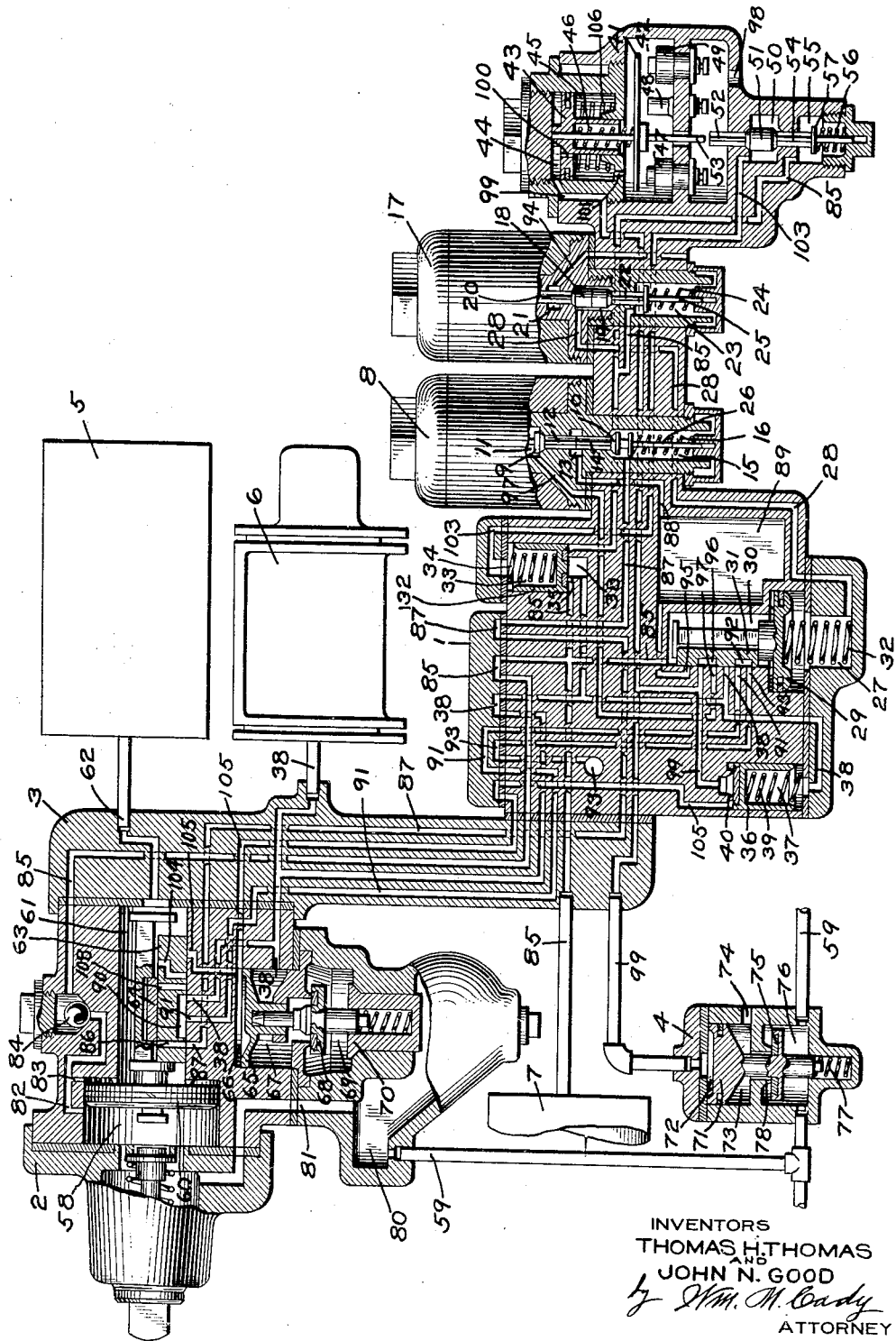

1,733,210

UNITED STATES PATENT OFFICE

THOMAS H. THOMAS, OF EDGEWOOD, AND JOHN N. GOOD, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA

ELECTROPNEUMATIC BRAKE

Application filed March 8, 1928. Serial No. 259,988.

This invention relates to electro-pneumatic brakes and more particularly to the type in which the brakes may be controlled either electrically or pneumatically.

One object of our invention is to provide an improved brake equipment of the above type, in which the brake cylinder pressure is built up at a faster rate in an emergency application of the brakes than in a service application of the brakes.

Another object of our invention is to provide an improved brake equipment of the above type having means by which the brake control may be changed from electric to pneumatic without causing an emergency application of the brakes.

Other objects and advantages will appear in the following more detailed description of our invention.

In the accompanying drawing, the single figure is a diagrammatic view, partly in section, of an electro-pneumatic brake equipment embodying our invention.

As shown in the drawing, the brake equipment may comprise two magnet valve devices secured to a selector valve portion 1, and a quick action triple valve device 2, said valve portion and valve device being mounted on a bracket 3, to which a vent valve device 4, an auxiliary reservoir 5, a brake cylinder 6 and an emergency reservoir 7 are connected.

One magnet valve device comprises a magnet 8 and valves 9 and 10 adapted to be operated by said magnet. The valve 9 is contained in a chamber 11 and has a fluted stem 12 extending through a suitable bore in the casing and engaging in a chamber 13, a fluted stem 14 of the valve 10, contained in chamber 15. A spring 16, contained in chamber 15 acts on a collared stem 26 in engagement with valve 10, tending to seat said valve and unseat the valve 9.

The other magnet valve device comprises a magnet 17 and a double beat valve 18 contained in a chamber 19 and adapted to be operated by said magnet. Said valve has at one side a fluted stem 20 extending through a suitable bore in the casing and through a chamber 21, and at the opposite side a fluted stem 22 extending through a suitable bore in the casing into a chamber 23. Said chamber contains a spring 24 acting on a collared stem 25 in engagement with the valve stem 22, thereby tending to seat the double beat valve 18 in the upper position, as shown in the drawing.

The selector valve portion 1 comprises a casing having a chamber 27 connected through passage 28 to the magnet double beat valve chamber 19 and containing a piston 29, and a valve chamber 30 containing a slide valve 31 adapted to be operated by said piston. A spring 32 in piston chamber 27 tends to maintain the piston 29 and slide valve 31 in their normal position, as shown in the drawing. Contained in a bore in the casing is a high pressure valve piston 132 having at one side a chamber 33 containing a spring 34 urging said valve piston downwardly toward a seat ring 35 formed in the casing. Contained in another bore in the casing is a valve piston 36 having at one side a chamber 37 connected through a passage and pipe 38 to the brake cylinder 6 and containing a spring 39 urging said valve piston upwardly toward a seat ring 40, formed in the casing.

Associated with the valve portion 1 is a short circuiting switch device comprising a switch 41 contained in a chamber 42, and a piston 43 having at one side a chamber 44 and at the opposite side a chamber 45, and adapted to operate said switch by means of a spring 46 interposed between said switch and piston. In the downward position, the switch 41 is adapted to connect electric train wire contacts 47, 48, and 49, but is normally maintained out of engagement with said contacts by a spring 106, acting on the piston 43.

Contained in a chamber 50 is a double beat valve 51, having at one side a fluted stem 52 extending through a suitable bore in the casing wall and into switch chamber 42 in axial alignment with a stem 53 secured to the under side of the switch 41. The valve 51 has at the opposite side a fluted stem 54 extending through a suitable bore in the casing and into a chamber 55, wherein a spring 56, acting on a collared stem 57 in engagement with the valve stem 54, tends to seat the valve 51 in the upper position, as shown in the drawing.

The triple valve device 2 comprises a casing having a piston chamber 58 connected to the usual brake pipe 59 and containing a piston 60, and a valve chamber 61, connected to the auxiliary reservoir 5 through passage and pipe 62 and containing a main slide valve 63 and an auxiliary slide valve 64 adapted to be operated by said piston. The quick action portion of the triple valve device comprises the usual quick action piston 65, having at one side a chamber 66 and at the opposite side a chamber 67 connected to the brake cylinder 6 through passage and pipe 38, and a vent valve 68 contained in a chamber 69 and adapted to be operated by said quick action piston. The usual check valve 70 is also contained in chamber 69.

The vent valve device 4 comprises a piston 71 having at one side a chamber 72 and at the opposite side a chamber 73 connected to the atmosphere through a passage 74, and a vent valve 75 contained in a chamber 76 and adapted to be operated by said piston. A spring 77 tends to hold the vent valve seated against a seat ring 78 formed in the casing.

A brake switch (not shown) may be employed in the locomotive to control the current flow through a single train wire to the magnets 8 and 17, in the manner disclosed in the prior patent of T. H. Thomas, No. 1,653,135, granted Dec. 20, 1927, such that when the brakes are electrically released, the magnet 8 is energized and the magnet 17 is deenergized.

In operation, the brake pipe 59 is charged with fluid under pressure through the usual brake valve device (not shown), which device is operated independently of the brake switch. Fluid under pressure then flows from the brake pipe to the triple valve piston chamber 58 through chamber 80 and passage 81 in the triple valve device 2, and shifts the piston 60 and slide valves 63 and 64 to the release position, as shown in the drawing. In this position, fluid under pressure flows from piston chamber 58 to valve chamber 61 through by-pass ports 82 and 83 and from thence through passage and pipe 62 to the auxiliary reservoir 5. Fluid under pressure also flows from passage 82 past a ball check valve 84 and through a passage 85 to the emergency reservoir 7, and also to selector slide valve chamber 30 of the valve portion 1, and from passage 85 to the outer seated area of the high pressure valve 132 outside of the seat ring 35, and thence to the double beat valve spring chamber 55, and to the magnet double beat valve spring chamber 23. With the magnet 17 deenergized, the double beat valve 18 is seated in the upper position by spring 24, thereby permitting fluid under pressure to flow from spring chamber 23 through valve chamber 19 and passage 28 to the selector valve piston chamber 27. The pressure of fluid thereby equalizes on the opposite sides of the selector piston 29 and the pressure of spring 32 is permitted to maintain said piston and the slide valve 31 in the normal position, as shown in the drawing.

Fluid under pressure flows from the triple valve slide valve chamber 61 through port 86 in the main slide valve 63 and passage 87 to the magnet valve chamber 15. With the magnet 8 energized, the valve 9 is seated and the valve 10 is unseated, so that fluid under pressure flows from said valve chamber 15 to chamber 13 and from thence through passage 88 to an emergency application chamber 89, thereby charging said chamber.

With the magnets 8 and 17 and triple valve device 2 in the release position as just described, the brake cylinder 6 is vented to the atmosphere through pipe and passage 38, cavity 90 in the triple valve slide valve 63, passage 91, cavity 92 in the selector slide valve 31 and the atmospheric passage 93. Spring chamber 37 below the valve piston 36, the seated area of the high pressure valve piston 132 inside the seat ring 35 and the quick action piston chamber 67, being connected to the brake cylinder passage 38 are also vented to the atmosphere. The short circuiting switch piston chamber 44 and vent valve piston chamber 72 are connected through pipe and passage 99 and are normally at atmospheric pressure due to the connection through port 100 in the switch piston 43, passage 101 in the lower casing wall of chamber 45, switch chamber 42 and atmospheric passage 98. The piston 43 and switch 41 are therefore maintained in their upper position by spring 106.

If it is desired to electrically effect a service application of the brakes, the current flow in the train wires (not shown) is so changed as to cause the magnet 17 to become energized and the magnet 8 to become deenergized, the supply of fluid under pressure to the brake pipe 59 being maintained the same as in electric release position.

Energization of magnet 17 causes the double beat valve 18 to be seated in its lower position, in which communication between spring chamber 23 and valve chamber 19 is cut off and the selector piston chamber 27 is vented to the atmosphere through passages 28, valve chamber 19, chamber 21 and through the atmospheric passage 94. The pressure of fluid in the selector valve chamber 30 then shifts the selector piston 29 and slide valve 31 to its downward position against the pressure of spring 32, in which position the selector valve chamber 30 is connected to the emergency application chamber 89 through passage 95, and the brake cylinder passage 38 is connected through a cavity 96 in the selector slide valve 31 to a passage 97 leading to the magnet valve chamber 11.

With the magnet 8 deenergized, the valve 10 is seated and the valve 9 is unseated by the pressure of spring 16, so that fluid under pressure is permitted to flow from the emergency reservoir 7, the auxiliary reservoir 5 and the brake pipe 59 to the brake cylinder 6, through passage 85, selector valve chamber 30, passage 95, emergency application chamber 89, passage 88, chamber 13, magnet valve chamber 11, passage 97, cavity 96 in the selector slide valve 31 and passage and pipe 38, thereby applying the brakes. It is possible for the fluid under pressure to flow from the auxiliary reservoir and brake pipe to the brake cylinder, as above described, since both are connected to passage 85 from the emergency reservoir, through the by-pass passages 82 and 83 and past the ball check valve 84. By thus using fluid under pressure from the auxiliary reservoir and brake pipe, the triple valve is maintained in release position, in which the auxiliary and emergency reservoirs tend to remain charged with fluid under pressure, on account of the brake pipe pressure being substantially maintained in the usual manner.

If while effecting an electric service application of the brakes, the brake pipe pressure in the triple valve piston chamber 58 should tend to reduce at a faster rate than the auxiliary reservoir pressure reduces in valve chamber 61, the triple valve piston 60 and slide valves 63 and 64 are prevented from moving to service position, since said piston is moved outwardly a slight distance, by the higher pressure in valve chamber 61, and throttles the opening of passage 82, so as to reduce the rate of drop of brake pipe pressure, and thus prevent a sufficient differential to develop on the opposite sides of said piston to cause it to shift the slide valves to service application position.

If it is desired to limit the degree of brake cylinder pressure obtained in a service application of the brakes, when the desired brake cylinder pressure is obtained, the operator effects a change in the magnet circuit so that the magnet 8 is energized and the magnet 17 remains energized. Energization of magnet 8 seats valve 9 and thereby prevents further flow of fluid under pressure to magnet valve chamber 11 and from thence through passage 97 to the brake cylinder 6.

In order to electrically effect an emergency application of the brakes, the train wire circuits are opened so that both magnets 8 and 17 are deenergized. Magnet 17 remaining deenergized, as when the brakes are released, the fluid under pressure is maintained in the selector valve piston chamber 27, so that the spring 32 maintains the selector piston 29 and slide valve 31 in their upper position, as shown in the drawing. The magnet 8 being deenergized, permits spring 16 to seat valve 10 and unseat valve 9, which permits the fluid under pressure from the emergency application chamber 89 to flow to the short circuiting switch piston chamber 44 and vent valve piston chamber 72. The short circuiting switch piston 43 is thereby shifted downwardly, causing the switch 41 to connect the train wire contacts 47, 48, and 49. Such downward movement of said switch causes the stem 53 to engage the fluted stem 52 of the double beat valve 51 and seat said valve in the downward position, in which communication is cut off between chambers 50 and 55 and chamber 50 is vented to the atmosphere past the fluted valve stem 52, through switch chamber 42 and the atmospheric port 98 in the bottom wall of said chamber. The high pressure valve piston chamber 33 being connected through passage 103 to valve chamber 50 is also vented, thereby permitting the fluid under pressure from the emergency reservoir 7, acting on the lower face of the valve piston 132 outside the seat ring 35, to shift said valve piston to its upper position against the pressure of spring 34, and thereby permit the fluid from the emergency reservoir to rapidly flow to the brake cylinder 6 through passage and pipe 38, and thus apply the brakes.

At the same time that the switch piston 43 is operated, the fluid under pressure supplied through passage and pipe 99 to the vent valve piston chamber 72 shifts the piston 71 downwardly and unseats the vent valve 75, thereby permitting the fluid under pressure to flow from the brake pipe 59 to the atmosphere through chamber 73 and passage 74. The triple valve piston chamber 58 being connected to the brake pipe is also vented, thereby permitting fluid at auxiliary reservoir pressure in valve chamber 61 to shift the piston 60 and slide valves 63 and 64 outwardly to emergency position, in which fluid under pressure is permitted to flow from the auxiliary reservoir 5 to the brake cylinder 6, through valve chamber 61, emergency port 104 in the main slide valve 63 and passage and pipe 38.

In emergency position of the triple valve slide valve 63, fluid under pressure also flows from valve chamber 61 through passage 105 to the quick action piston chamber 66 and to the upper face of the valve piston 36, outside of the seat ring 40. Said quick action piston and valve piston are not operated by the pressure from valve chamber 63, however, due to the rapid rate of build-up of brake cylinder pressure in electric emergency, which pressure is effective in the quick action piston chamber 67, and the valve piston chamber 37. Said quick action piston and valve piston are operated only in case of an emergency application of the brakes effected by a sudden venting of the brake pipe to the atmosphere when the brakes are fully released, as will be hereinafter described.

It should be noted, that when an electric emergency application of the brakes is effected, fluid under pressure is permitted to flow to the brake cylinder at a faster rate than when an electric service application of the brakes is effected, since said fluid under pressure is supplied to the brake cylinder by operation of the high pressure valve piston 132, as well as through the emergency port 104 in the triple valve slide valve 63.

If during an electrically controlled service application of the brakes, it is desired to effect an electric emergency application of the brakes, the current supply to the magnets 8 and 17 is cut off, so that the magnet 17 as well as the magnet 8 are deenergized. The double beat magnet valve 18 is then shifted to its upper position by spring 24, in which position the selector piston chamber 27 is again charged with fluid under pressure, thereby permitting spring 32 to return the selector piston 29 and slide valve 31 to their inner position, after which an emergency application of the brakes occurs in the same manner as hereinbefore described. It should therefore be noted that when electrically controlling the brakes, an emergency application thereof can be obtained whenever desired.

If, when the brakes are in electric release position, fluid under pressure should be suddenly vented from the brake pipe 59, as by the bursting of a hose, the triple valve piston 60 and slide valves 63 and 64 are shifted to emergency position in the usual manner and fluid under pressure then flows from the auxiliary reservoir 5 through port 104 in slide valve 63 to the brake cylinder 6 and at the same time, through passage 105 to the quick action piston chamber 66 and to the upper seated area of valve piston 36, outside of the seat ring 40.

The pressure of fluid in the quick action piston chamber 66 shifts the piston 65 downwardly, thereby unseating vent valve 68 and permitting fluid at brake pipe pressure in chamber 80 to lift the check valve 70 and flow through chamber 69 and past the valve 68 to chamber 67 and from thence through passage and pipe 38 to the brake cylinder, thereby causing a local reduction in brake pipe pressure in the well known manner.

The pressure of fluid on the upper face of the valve piston 36, outside the seat ring 40, shifts said valve piston to its downward position against spring 39, thereby permitting fluid under pressure to flow from passage 105 through passage and pipe 99 to the short circuiting switch piston chamber 44 and vent valve piston chamber 72. The short circuiting switch piston 43 is thereby shifted downwardly, causing switch 41 to bridge the train wire contacts 47, 48, and 49, thereby shorting the circuits in the train wires and causing the magnets 8 and 17 to become deenergized on every car in the train, so as to electrically effect an emergency application of the brakes in the same manner as hereinbefore described. The vent valve 75 is also opened by the pressure of the fluid on the vent valve piston 71, in order to locally vent the brake pipe, so as to pneumatically propagate quick action serially throughout the train.

When the brake cylinder pressure becomes substantially equal to the auxiliary reservoir pressure, said brake cylinder pressure reacting on the quick action piston 65 in chamber 67 and on the valve piston 36 in chamber 37, permits the vent valve 68 to be returned to its normal seated position and the valve piston 36 to be shifted to its upper position by spring 39, thereby closing communication between passages 105 and 99. The fluid under pressure acting on the vent valve piston 72 and switch piston 43 then flows to the atmosphere through port 100 in piston 43, chamber 45, passage 101, switch chamber 42 and passage 98, thereby permitting spring 77 to seat the vent valve 75 and spring 106 to shift the switch 41 out of engagement with the train wire contacts, so as to permit the brake pipe to be recharged and the brakes released, when desired.

When an emergency brake application is effected in the manner hereinbefore described, the brake valve device in the locomotive is turned to lap position, so as to prevent further flow of fluid under pressure to the brake pipe, which might cause an undesired release of the brake application.

It will be noted that when an electric emergency application of the brakes is effected, the brake pipe is vented and the triple valve device is operated. This is desirable in order to always ensure a brake application, as in the case of a burst hose, if the switch 41 fails to short the train wire circuit on the car adjacent the burst hose, the emergency action is pneumatically propagated to a car on which said switch does operate properly.

In order to release the brakes after an electric emergency application, the brake switch in the locomotive is operated in such a manner as to restore the electric circuit through magnet 8. Said magnet is thereby energized and the magnet 17 remains deenergized. The brake valve in the locomotive is then turned from lap to running position, in which fluid under pressure is supplied to the brake pipe 59, thereby recharging said brake pipe and causing the auxiliary reservoir 5 and emergency reservoir 7 to be recharged and the fluid under pressure to be vented from the brake cylinder to the atmosphere, in the same manner as in initially charging the equipment.

If the electric brake control system should fail for any reason, the magnets 8 and 17 both become deenergized and the equipment operates to apply the brakes in emergency in the same manner as hereinbefore described. Under such a condition, the emergency application can be released and the brake apparatus recharged pneumatically by recharging the brake pipe with the brake valve device in running position. Since both magnets 8 and 17 are deenergized, the double beat magnet valve 18 is seated in the upper position, so as to permit fluid under pressure from the emergency reservoir 7 to flow from spring chamber 23 to the selector piston chamber 27 and thereby maintain the selector piston 29 and slide valve 31 in their inner position, in which the brake cylinder is connected to the atmosphere through pipe and passage 38, cavity 90 in the triple slide valve 63, passage 91, cavity 92 in the selector slide valve and the atmospheric passage 93.

With the brakes in pneumatic released condition, a service application thereof can be effected, when desired, by moving the brake valve device to service position and gradually reducing the brake pipe pressure in the usual well known manner, thereby causing the triple valve piston 60 to shift the slide valve 63 and 64 to service position, in which fluid under pressure is permitted to flow from the auxiliary reservoir 5 through the service port 108 in the main slide valve 63 and passage and pipe 38 to the brake cylinder and thereby apply the brakes. If it is desired to pneumatically effect an emergency application of the brakes, the brake valve is moved to emergency position, in which the fluid under pressure is suddenly vented from the brake pipe 59, thereby causing the triple valve piston 60 to shift the slide valves 63 and 64 to emergency position in which fluid under pressure flows from the auxiliary reservoir 5 to the brake cylinder 6 through the emergency port 104 in the main slide valve 63. Also, the quick action piston 65 operates the vent valve 68, and the vent valve 75 and high pressure valve piston 132 are operated in the same manner as hereinbefore described to cause a high brake cylinder pressure to be built up at a rapid rate and to propagate the quick action throughout the train.

In order to release after a pneumatic emergency brake application, the brake pipe pressure is restored, thereby causing the auxiliary and emergency reservoirs to be recharged and the brake cylinder to be connected to the atmosphere in the same manner as when releasing after an electric emergency brake application.

It will be evident from the above description of pneumatic operation of this brake apparatus, that a locomotive not equipped with means for electrically controlling the brakes, can be coupled to a train of cars equipped with the brake apparatus and then pneumatically control the train brakes in the usual, well known manner.

In a long train, a large quantity of fluid under pressure is required to charge the brake system and release the brakes, and this requires a considerable period of time. In order to conserve the fluid under pressure and to effect a change from one locomotive to another locomotive in a minimum of time, when the brakes are being electrically controlled, the electric brake switch is left in release position and a service application of the brakes is effected pneumatically. With the triple valve in service position, the emergency application chamber 89 is vented to the atmosphere through passage 88, past the unseated magnet valve 10, through passage 87, cavity 90 in the main triple valve slide valve 63, passage 91, cavity 92 in the selector slide valve 31 and the atmospheric passage 93. After said chamber is thus vented, the current supply is cut off to magnet 8 and magnet 17 remains deenergized. With magnet 17 deenergized the selector piston 29 and slide valve 31 are maintained in their upper position, while deenergization of magnet 8 permits valve 10 to seat and valve 9 to unseat. Unseating of valve 9 has no effect in this case, however, since the emergency application chamber 89 is at atmospheric pressure. After the change in locomotive is made, the brake pipe pressure is restored in the usual manner, and in case of electric brake control, the magnet 8 is reenergized by moving the brake switch to release position thereby causing the brakes to release in either case, and in the same manner as hereinbefore described.

In changing locomotives on a train in the manner just described, the amount of fluid under pressure vented from the brake pipe to apply the brakes in service need not exceed that necessary to just hold the train, so that after the locomotives are changed, only a short period of time is required to recharge the brake pipe and release the brakes.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. The combination with apparatus for pneumatically effecting a service application of the brakes and electrically controlled means operated upon deenergization for effecting an emergency application of the brakes, of means operated upon pneumatically effecting a service application of the brakes for preventing the electrically controlled means from effecting an emergency application upon deenergization.

2. The combination with a valve device operated by a variation in fluid pressure for effecting a service application of the brakes, valve means operated by fluid under pressure for effecting an emergency application of the brakes, and electrically controlled means operated upon deenergization for supplying fluid under pressure to said valve means, of means operative upon effecting a service application of the brakes for preventing said electrically controlled means from supplying fluid under pressure to said valve means when deenergized.

3. The combination with valve means operated by fluid under pressure for effecting an emergency application of the brakes, of electrically controlled means operated upon deenergization for supplying fluid under pressure from a chamber to said valve means and a valve device operative to effect a service application of the brakes and operative in effecting a service application of the brakes to vent fluid under pressure from said chamber.

4. The combination with valve means operated by fluid under pressure for effecting an emergency application of the brakes, of electrically controlled means operated upon deenergization for supplying fluid under pressure from a chamber to said valve means and a valve device having a release position in which fluid under pressure is supplied to said chamber and operative to effect a service application of the brakes, said valve device being adapted in effecting a service application of the brakes to vent fluid under pressure from said chamber.

5. In an electro-pneumatic brake, the combination with a brake pipe and valve means operated by fluid under pressure for effecting a reduction in brake pipe pressure, of electrically controlled means operated upon deenergization for supplying fluid under pressure from a chamber to said valve means and a valve device having a release position in which fluid under pressure is supplied to said chamber and operated upon a reduction in brake pipe pressure for effecting a service application of the brakes and for venting fluid under pressure from said chamber.

6. In an electro-pneumatic brake, the combination with electrically controlled means operated upon deenergization for effecting an emergency application of the brakes, of means for effecting a service application of the brakes and operative upon effecting a service application of the brakes for preventing said electrically controlled means from effecting an emergency application of the brakes.

7. In an electro-pneumatic brake, the combination with valve means operated by fluid under pressure for effecting an emergency application of the brakes, of a valve device having a release position in which fluid under pressure is supplied to a chamber and a service application position in which fluid under pressure is vented from said chamber and electrically controlled means for controlling communication from said chamber to said valve means.

8. In an electro-pneumatic brake, the combination with valve means operated by fluid under pressure for effecting an emergency application of the brakes, of a valve device having a release position in which fluid under pressure is supplied to a chamber and a service application position in which fluid under pressure is vented from said chamber and electrically controlled means for controlling communication from said valve device to said chamber and from said chamber to said valve means.

9. In an electro-pneumatic brake, the combination with valve means operated by fluid under pressure for effecting an emergency application of the brakes, of a valve device having a release position in which fluid under pressure is supplied to a chamber and a service application position in which fluid under pressure is vented from said chamber and electrically controlled means for controlling communication through which fluid under pressure is supplied to and released from said chamber by said valve device and communication from said chamber to said valve means.

10. In an electro-pneumatic brake, the combination with valve means operated by fluid under pressure for effecting an emergency application of the brakes, of an auxiliary reservoir, a triple valve device having a release position in which fluid under pressure is supplied from said auxiliary reservoir to a chamber and a service application position in which fluid is vented from said chamber, and electrically controlled means for connecting said chamber to said valve means.

11. In an electro-pneumatic brake, the combination with valve means operated by fluid under pressure for effecting an emergency application of the brakes, of an auxiliary reservoir, a triple valve device having a release position in which fluid under pressure is supplied from said auxiliary reservoir to a chamber and a service application position in which fluid is vented from said chamber, and electrically controlled means operated upon deenergization for connecting said chamber to said valve means.

12. In an electro-pneumatic brake, the combination with a brake cylinder, of an emergency reservoir normally charged with fluid under pressure, valve means for controlling the supply of fluid under pressure from said reservoir to the brake cylinder, and electrically controlled means operated upon deenergization for effecting the operation of said valve means.

13. In an electro-pneumatic brake, the combination with a brake pipe and brake cylinder, of an emergency reservoir, valve means for controlling the supply of fluid under pressure from the emergency reservoir to the brake cylinder, a valve device for controlling the operation of said valve means, electrically controlled means for effecting the operation of said valve device, and means operated upon a sudden reduction in brake pipe pressure for also effecting the operation of said valve device.

14. In an electro-pneumatic brake, the combination with a brake pipe and brake cylinder, of an emergency reservoir, valve means for controlling the supply of fluid under pressure from the emergency reservoir to the brake cylinder, a valve device operated by fluid under pressure for effecting the operation of said valve means, electrically controlled means operated upon deenergization for supplying fluid under pressure to said valve device, and means operated upon a sudden reduction in brake pipe pressure for also supplying fluid under pressure to said valve device.

15. In an electro-pneumatic brake, the combination with a brake pipe, a brake cylinder, and an emergency reservoir, of electrically controlled means operated upon deenergization for effecting the supply of fluid under pressure from the emergency reservoir to the brake cylinder and means operated upon a sudden reduction in brake pipe pressure for also effecting the supply of fluid under pressure from the emergency reservoir to the brake cylinder.

16. The combination with pneumatically controlled means for controlling the brakes, electrically controlled means for controlling the brakes, and means for changing the control of the brakes from one of the controlling means to the other without effecting an emergency application of the brakes.

17. The combination with apparatus for pneumatically effecting a service application of the brakes and electrically controlled means operated upon deenergization for effecting an application of the brakes, of means operated upon pneumatically effecting a service application of the brakes for preventing the electrically controlled means from effecting an application upon deenergization.

In testimony whereof we have hereunto set our hands and seals, on this 6th day of March, 1928.

THOMAS H. THOMAS.
JOHN N. GOOD.